P. M. LINCOLN.
ELECTRIC METER.
APPLICATION FILED MAY 18, 1915.

1,305,227.

Patented May 27, 1919.
3 SHEETS—SHEET 2.

P. M. LINCOLN.
ELECTRIC METER.
APPLICATION FILED MAY 18, 1915.

1,305,227.

Patented May 27, 1919.
3 SHEETS—SHEET 3.

WITNESSES

INVENTOR

UNITED STATES PATENT OFFICE.

PAUL M. LINCOLN, OF PITTSBURGH, PENNSYLVANIA.

ELECTRIC METER.

1,305,227.  Specification of Letters Patent.  Patented May 27, 1919.

Application filed May 18, 1915. Serial No. 28,832.

*To all whom it may concern:*

Be it known that I, PAUL M. LINCOLN, a citizen of the United States, residing at Pittsburgh, in the State of Pennsylvania, have invented certain new and useful Improvements in Electric Meters, of which the following is a specification.

My invention relates especially to instruments for measuring electric power; its primary objects are, to produce a load factor meter; to make the recording instrument respond more nearly to variations in the actual cost of the power being provided; to provide a weighted load factor meter, and a maximum demand meter, of superior construction and operation; to provide for recording several additional factors or elements entering into the proper measurement of power supplied, and generally to improve and simplify the mechanical construction of such instruments. The invention is illustrated in several forms in the accompanying drawings, in which:

I have in other applications developed certain forms of wattmeters in which the indication is dependent upon the accumulated effects over a certain predetermined time period, or, in which the instrument gives a "logarithmic average indication", dependent upon the time lag between the flow of a current, and its ultimate full effect on the instrument. To further improve the meter to operate in accordance with the real cost of supplying the power, I herein show means of modifying this logarithmic average demand indication in accordance with conditions of supply; and furthermore, I provide for a complete indication of all the conditions which ought to be taken into account in fixing prices, by indicating the weighted integrated averages, the weighted integrated maxima, and hence the weighted load factor.

Since electricity cannot be stored, the apparatus at a central supply station must be sufficiently large to carry the maximum power at the maximum moment of use throughout the year; and it is to the advantage of both the producer and the customer to reduce this expense as much as possible. Obviously a customer who takes his load at the same time as the maximum demand on the central station increases the required capacity of the station, while a customer who takes the maximum load at some other time does not; therefore the actual cost of supplying power to the first mentioned customer is greater than to the second. The load which has the least cost will be not only the load taken at the time of minimum demand on the central station, but the load which has the least variation in maximum demand. That is to say the fixing of rates by the meter ought logically to depend at least in part upon the load factor or the ratio between the actual average demand for power, and the maximum momentary or short time demand for power. I have herein disclosed means for taking care of all these items.

Figure 2:
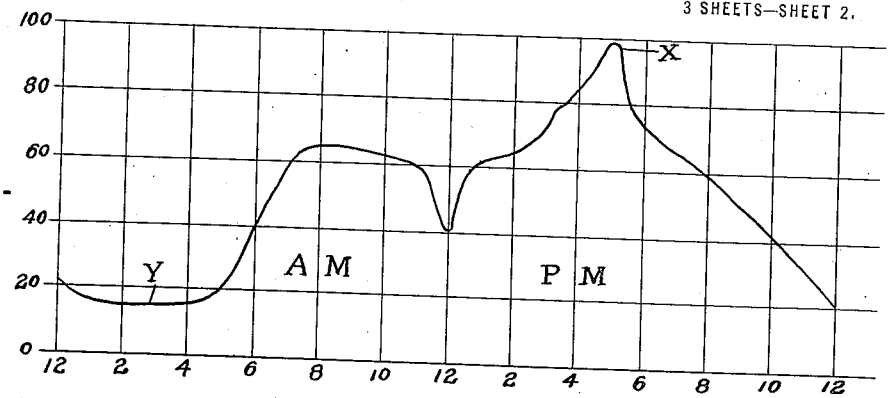
Fig. 2 is an illustrative diagram of a typical load curve of a central supply station.
Figure 3:
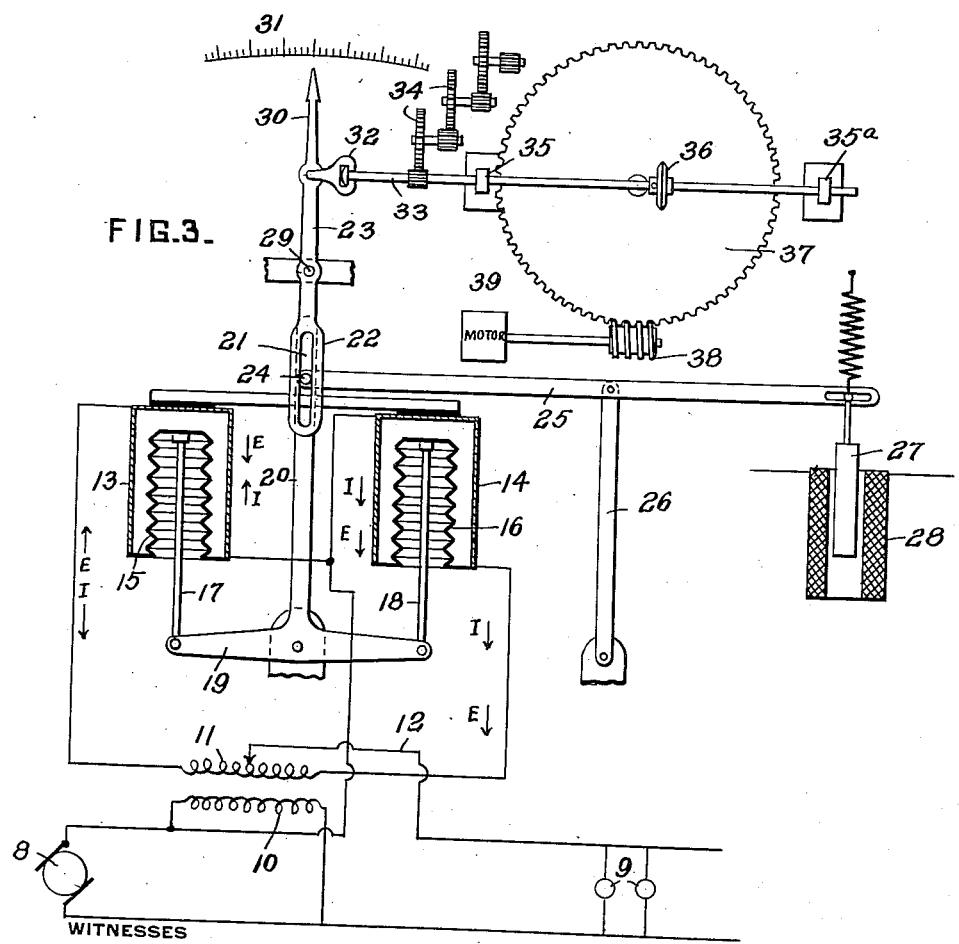
Fig. 3 is a diagram and partial section showing a simple variable rate wattmeter and the circuits for operating it.

For simplicity of disclosure I refer first to Fig. 2, which shows a typical daily load curve of an electric supply plant in a large city, from which it will be seen that the maximum demand at X, occurring about 5 p. m., is about five times the minimum demand at Y, occurring from 1 to 4 a. m. In order to vary the readings of the meter in accordance with this variation of demand on the central station, I may conveniently build the apparatus as shown in Fig. 3. In this case suppose the generator 8 to be supplying the line containing the loads 9; I insert a shunted coil 10 forming the primary of the transformer of which the coil 11 is the secondary, and meanwhile connect the two parts of the coil 11 as two parallel branches in series with the lead 12. I thus obtain two derived currents, of which one is proportional to the amperage, and one proportional to the voltage of the circuit to be measured. A combination of the effects of these currents will proportionally actuate an indicating instrument to show the watts, substantially as set forth in my article on rate making published in the October, 1915 *Proceedings of the American Institute of Electrical Engineers*. In this instance the series current passes through the walls of two expansion tubes 13 and 14, in the direction shown by the arrows marked I; and the voltage current derived from coil 11 by induction from the shunt coil 10 will flow through the same cylinders in the directions indicated by the arrows marked E. These cylinders 13 and 14 contain oil or other easily expansible liquid, and also the reëntrant chambers 15 and 16 composed of nests of flexible diaphragms, so that the expansion of the liquid due to heating by the currents will expand the diaphragms and move respectively the rods 17 and 18, and by means of rocker arm 19 move the pointer arm 20 in an angular direction in proportion to the watts. That is, the expansion in chamber 13 is due to the difference in effects of the amperage and voltage currents, while the expansion in chamber 14 is due to the combined effects of these currents, and the differential action on rocker arm 19 will be proportional to the wattage.

The bar 20 has a slotted head 21 connecting to the slotted head 22 of the pointer arm 23 by a pin 24 in the end of the bar 25. These slots in heads 21 and 22 coincide in position at zero watts. This bar 25 is supported on a pivoted link 26, and at the far end is attached to the core 27 of a solenoid 28, whose windings are in a circuit connected with the central power station, and carrying a current proportional to the total current being generated at the station at any particular moment.

The pointer arm 23 is also pivoted to a fixed support at 29, and the other end 30 travels over a scale 31. Obviously the amount of movement of the pointer 30 for a given angular movement of arm 20 will depend upon the position of the pin 24, and this in turn will depend upon the demand at the moment being made on the central power station. That is to say, if the central station demand were at the point X on the curve in Fig. 1, the pin 24 would be at its highest point in the slotted head 22, and the pointer 30 would move with its greatest range; whereas at the point Y on the diagram of Fig. 1 the pointer 30 would move at a smaller range in indicating the same amount of power supplied to the local station.

For registering integrations I may attach to the arm 30 a yoke 32, having a bearing for a shaft 33 geared to a set of registering indicators of the usual style, 34. The shaft 33 reciprocates through bearings 35, 35$^a$, and has fixed upon it a small brush wheel 36 traveling in contact with a plate 37 driven by worm gear 38 from a constant speed motor 39. The adjustments are such that when the meter is at zero on the scale 31, the brush wheel 36 is at the center of the table 37; so that the departure of this wheel 36 from the center will be dependent upon the joint action of the meter and of the solenoid 28. The rotation of shaft 33 in conjunction with the position of the wheel 36 will cause gearing 34 to register a number of revolutions depending upon the total average load at the central plant, as well as the demand of the customer's load.

Figure 5:
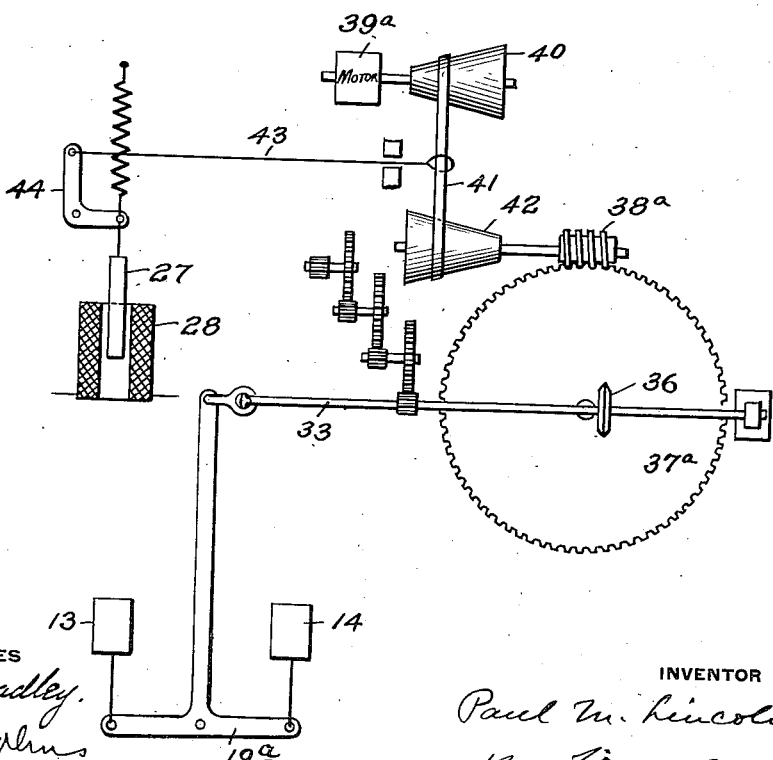

An equivalent result may be obtained by varying the speed of the table 37. For example, as shown in Fig. 5, the tilting rocker arm 19$^a$ may directly move the shaft 33 with the brush wheel 36 as before; but between the worm gear 38$^a$ and the driving motor 39$^a$ we may employ a variable speed belting device, 40, 41, 42, and move the belt by means of a connection 43 connected by bell crank lever 44 to the core 27 of the solenoid 28. In these devices the indication of the train of gears 34 will not be in kilowatt hours, but will be in a quantity upon which the cost of service depends more nearly than it does upon the kilowatt hours.

Figure 4:
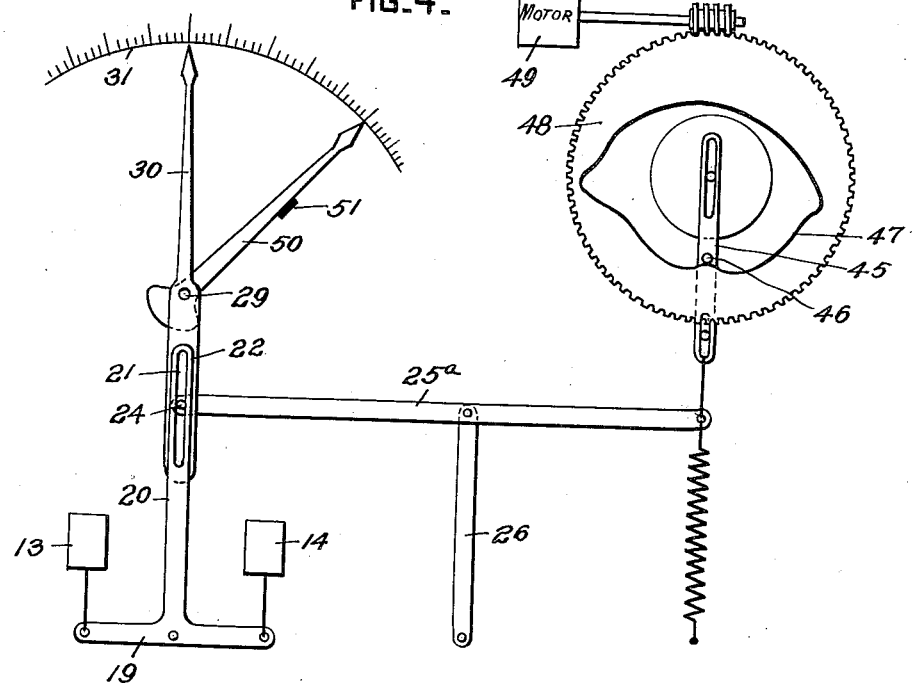
Figs. 4 and 5 are partial diagrams representing other ways of modifying the indication of the wattmeter.

In Fig. 4 I have indicated another method of taking into account the amount of load on the central plant. The essential elements of the wattmeter are as before described with respect to Fig. 3, except that the bar 25$^a$ in this case is connected to a sliding bar 45 carrying a pin or roller 46, which travels over a cam surface 47 in a constantly revolving plate 48 driven by the motor 49. This cam corresponds to the load curve of Fig. 2. The arrangement is to meet the objection of providing on each customer's premises a current proportional to the total plant load; while not so accurate, this furnishes a good substitute for the scheme of Fig. 3.

In this mechanism of Fig. 4 I provide in addition to the pointer 30 a loose pointer 50 which is pushed forward by pointer 30 acting on the lug 51 and left at the highest position attained, which will thus show the maximum effect of the joint action of the wattmeter and the cam 47. Such maxima may be made to effect the rate for service, as shown in Fig. 1.

Figure 1:
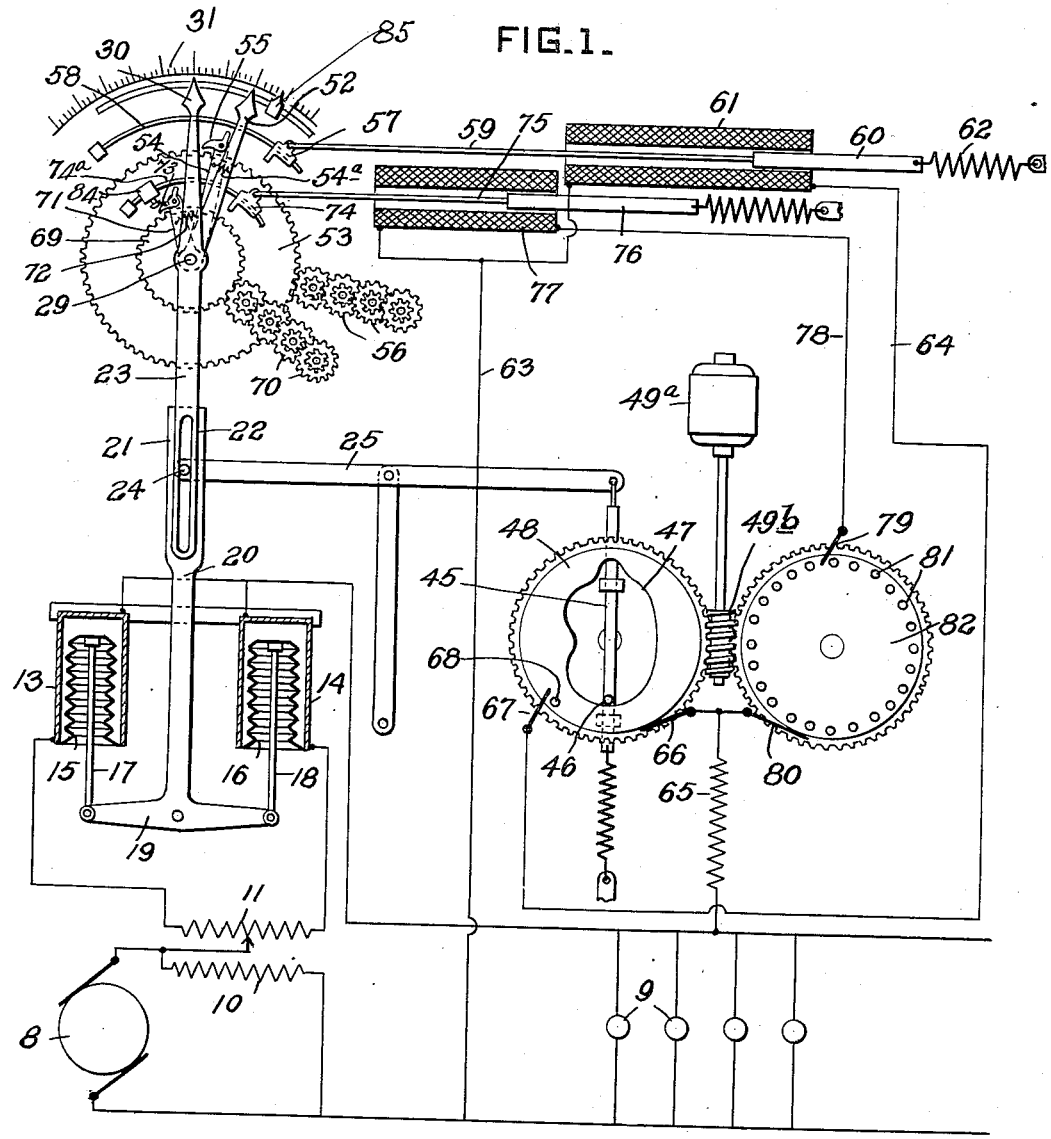
Figure 1 is a diagram showing the circuits and the outlines of construction of a load factor meter.

The load factor, being the ratio of the average to the maximum in a given load, is a quantity of great importance in rate fixing; and the device shown in Fig. 1 permits the obtaining of both the average and the maximum that has occurred since last inspected, and for this reason I prefer to call the instrument a "load factor" meter.

In this arrangement, as before, the generator 8 feeds the line containing the load 9, and the circuit is provided with the shunt coil 10 and the series coil 11 heating the resistances 13 and 14, thereby to expand the diaphragms 15 and 16 respectively and by the rods 17 and 18 cause a differentiation of the rocker arm 19 and the arm 20. Also as before the arm 20 has a slotted head 21, which is engaged with a slotted head 22 of the pivoted bar 23 by means of a pin 24, which may be in some cases carried on a link 25 and operated as above described for Fig. 4. That is, there is provided a plate 48 having a cam 47, which engages the pin 46 of a bar 45, attached to a link 25. The plate 48 being provided with teeth is operated by the worm gear 49$^b$ of the motor 49$^a$. Thus the motion of the rocker arm bar 20 is imparted to the pivoted arm 23 with a scope of movement dependent upon the position of the pin or roller 46 on cam 47, so as to vary with the ideal or presumed variable plant load at the central station.

The arm 23, pivoted at 29, and carrying the pointer 30 traveling over scale 31, as before, is arranged to push along the idle maximum pointer 52 as it travels to the right. This arm may be pivoted at the point 29; and there is also provided on the point 29 a gear wheel 53, and an engaging arm 54, which carries a dog 55 normally held in elevated position, but arranged when depressed, to engage the wheel 53, and thereby turn the train of gears 56 of any convenient form of dial indicating device. This action is caused by the movable block 57, which travels on a track 58, and is propelled to the left by the rod 59 on the plunger 60 of a solenoid 61. It is normally held over to the right by retractile spring 62; and it will be observed that the electric circuit for operating the solenoid is closed through leads 63 and 64, resistance 65, brush 66, and brush 67, whenever the latter strikes the pin 68, located on the revolving disk 48, which it will be understood revolves periodically and makes for example one turn per day. That is, once each day the circuit of the solenoid 61 will be closed, the plunger 60 will effect the movement of the traveling block 57 to the left, it will strike the upturned spur of the dog 55, and cause it to engage the wheel 53 and turn the gears 56. It will therefore affect these gears with the motion whose scope or length of travel will depend on the position of the pointer 52 at the time of contact, the operating arm 54 being attached to the pointer 52 by the retractile spring 54$^a$. In other words the registering gears 56 will be moved once a day or other period by an amount indicating the maximum position of the wattmeter pointer 30 during the twenty-four hours or other period preceding. It will be understood that after each excursion of the block 57 to the left, maximum pointer 52 will be left lying against the pointer 30, and therefore free to assume the maximum position attained by pointer 30 within the next period.

Also I prefer to use another index or pointer 85 interposed in the path of the pointer 30, and adapted to remain in any position to which it is moved by pointer 30 until manually reset. This serves to indicate the maximum periodic demand since the last reading of the meter.

Also pivoted at the point 29 is another toothed wheel 69 connected to registering gearing 70, and a second actuating arm 71 held by retractile spring 72 to the wattmeter pointer arm 30. This is provided with a dog 73 as in the other case, and this dog is operated by a traveling block 74 moved by the rod 75 of plunger 76 in the solenoid 77. By the lead 63, resistance coil 65, and brush 80, on the one side, and lead 78, brush 79, and pins 81 on the other, the circuit of this solenoid is made through the disk 82, driven by the worm 49$^b$, say once each hour, or once each ten minutes, or other period, as may be convenient. That is to say, every ten minutes, by the regular movement of the toothed disk 82, the circuit of solenoid 77 will be made, the block 74 will move to the left, tripping the dog 73 and thereby turning the wheel 69 and the registering gears 70. The amount of movement of such gears will of course depend upon the position of dog 73 with respect to the circumference of wheel 69 at the moment,—that is to say, since arm 71 lies against the pointer 30 the movement will depend upon the position of the pointer 30, and the train of gears 70 will register the weighted integrated average of watts, while the train of gears 56 will register the weighted integrated maxima of the watts. I say weighted averages and weighted maxima because the indication depends also on the position of the pin 24 connecting arms 20 and 23, which it will be remembered is dependent upon the cam 47 representing the central plant load variations.

By providing a stop 84 mounted adjustably in position upon the curved track 74$^a$, I may limit the movement of the movable block 74 toward the left at any desired point, so that the meter is adapted to integrate only the excess over a predetermined value of the periodic average demand for power. This arrangement is useful when a customer is to be charged a certain minimum price for service, and an extra sum for all power in excess of a predetermined amount corresponding to the minimum charge. Thus the meter becomes what may be called an excess demand meter.

The pin 24 instead of being forced to move by the bar 25 may of course be attached to one of the heads 21 or 22, and the bar 25 disconnected, in which case the instrument will give the integrated averages and the integrated maxima,—unweighted. In this case the ratio between the averages and the maxima will indicate the load factor, whereas the indication above described will not give the simple load factor, but a quantity depending upon the load factor, and also upon the predetermined station load. As this function or indication is new, and especially new as an element of a wattmeter, I have suggested the term "weighted load factor."

It will be understood that the use of the retractile springs 54ª and 72 permit the free movement of the pointer arms 30 and 52 notwithstanding the engagement of the blocks 57 and 74; and it will be understood that the limit of throw of these blocks should be such as to bring them, in their excursion to the left, to the zero position of the respective pointers.

By this apparatus I provide a simple, compact, and easily adjustable instrument which will give all necessary information for fixing rates of charge for electric power in accordance with the actual cost of supplying the power. It will be understood that by "logarithmic average demand" I mean a quantity which at the moment of reading represents, not the energy at that instant flowing, but in a certain large proportion, the integrated average energy which has flowed during the last predetermined time period. For instance, if we have a meter of such characteristics that, with a steady load, it reaches 90% of its final value in one hour, and if the demand lasts for only one-half of an hour, $68\frac{3}{10}\%$ of the full rate is registered, and 90% for the full period, 99% for two periods, etc. In other words, the value or weight of the demand during a given instant in the indication depends upon its remoteness from the time of taking the observation according to the logarithmic law by which for instance 90% of the final or ideal value will have been reached in a certain predetermined period.

It will be noted also that in the instrument set forth, the indicating pointers control a lever which has a reciprocating motion, approaching their final value according to this logarithmic law, and then being returned to initial position by the timing device and thereby effecting an integration. The method of integration is therefore quite different from the method in which are involved wattmeters of continuous motion showing at any instant the then value of the power flowing at that instant.

Other advantages of the devices will readily occur to those familiar with the art.

Having thus described my invention and illustrated its use, what I claim is the following:

1. The combination of a wattmeter having a definite time lag in its indication, a device to integrate a series of periodic maximum indications of said meter, and a device to integrate a series of periodic indications of said meter.

2. The combination of a wattmeter including a pointer always indicating the logarithmic average demand for power, and devices for integrating a series of maximum movements of said pointer.

3. The combination with a wattmeter having an oscillating indicating element, means for integrating a series of periodic maximum excursions of said element, and means for contemporaneously varying the movements of the element in accordance with the variations of a typical central total load curve.

4. The combination of a wattmeter indicating the logarithmic average demand and employing an oscillating pointer, of means mechanically connected to the pointer for constantly modifying its movement in accordance with variations of a typical load curve of the supply station, substantially as described.

5. The combination with a wattmeter indicating the logarithmic average demand and employing an oscillating indicating element, of means for continually modifying the action of said indicating element in accordance with a curve representing the variations of load on the central supply station, and means for integrating a series of periodic resultant indications of the indicating element.

6. In a wattmeter, the combination of two circuits derived from the circuit to be measured, one of which carries a current proportional to voltage of the supply circuit and the other proportional to the amperage thereof, two differentially actuated expansion devices operated by the algebraic sum of such derived current, a scale and a pointer moved over the scale by the conjoint action of said expansion devices, a registering device and means operatively connected to the pointer for controlling the movements of said pointer in accordance with a typical curve varying with the load on the central supply station.

7. In a wattmeter, the combination of devices for registering the logarithmic average wattage over a predetermined short time period, devices to modify said indication approximately with the variations of a typical load curve of the supply station, a maximum indicating pointer on the wattmeter, and a device for integrating a series of maximum wattage indications.

8. A wattmeter comprising the combination with suitable derived circuits traversed by currents respectively proportional to the voltage and the amperage of the circuit to be measured, of a device located in both said derived circuits adapted to algebraically sum the amperage and voltage effects, a pivoted indicating element differentially affected by said device, means mechanically connected to the indicating element for modifying the extent of its movement substantially in accordance with the variations of the typical momentary demand on the central power station, and a registering device operated by said indicating element.

9. An electric meter comprising an indicator actuated in accordance with the logarithmic average demand, means for integrating the periodic movements of said indicator, and means for integrating a series of its maximum positions.

10. A wattmeter comprising a reciprocating element moved in one direction in accordance with the logarithmic average demand for power in the circuit being measured, registering means and an integrating mechanism comprising a pawl and ratchet device and a resilient connection between the pawl and the registering means, and means for periodically actuating the pawl.

11. The combination with a wattmeter having a slow responding pointer, of means for periodically summating the movement of the pointer.

12. The combination with a wattmeter having a slow-responding member, of means for integrating the maximum indications of the instrument, and means for varying the movement of the member in accordance with variations of a predetermined load curve.

13. The combination with a measuring instrument having a slow-responding oscillating indicating member, of means for integrating the periodic movements of the said member, and means for integrating a series of its maximum movements.

14. In a measuring instrument for an electric circuit, the combination with a pointer, of means for actuating the pointer in accordance with the maximum demand of energy traversing the circuit and in accordance with a curve corresponding to the variations of load on the central supply station, and means for integrating a series of periodic indications of the pointer.

15. The combination with a slow-responding wattmeter, of means for periodically integrating the indications of the meter.

16. The combination with a wattmeter adapted to indicate the average demand for power, of means for periodically summating the indications.

17. The combination with a wattmeter having a pointer for indicating the average demand for power, of means for periodically registering the integrated average demand as indicated by the pointer.

18. The combination with means for indicating the average demand for power, of means for periodically integrating the indications.

19. The combination with a wattmeter having a pointer for indicating the logarithmic average demand for power, of means for periodically summating the movement of the pointer.

20. The combination with a wattmeter having a pointer for indicating the logarithmic average demand for power, of time-controlled means for periodically registering a value proportional to the indication of the pointer.

21. In a wattmeter, the combination with a slow-responding pointer, of an integrating mechanism, and means for periodically actuating the integrating mechanism in accordance with the indication of the pointer.

22. In a wattmeter, the combination with a pointer for indicating the logarithmic average demand for power, of an integrating mechanism, and means for periodically actuating the integrating mechanism in accordance with the indication of the pointer.

23. The combination with a wattmeter having a slow-responding pointer, of means for periodically integrating the movements of the pointer.

24. The combination with a wattmeter having a pointer for indicating the logarithmic average demand for power, of means for periodically integrating the movements of the pointer.

25. The combination with a wattmeter having a pointer for indicating the logarithmic-average demand for power, of means for periodically registering the integrated average demand as indicated by the pointer.

26. The combination with a wattmeter having a pointer for indicating the logarithmic-average demand for power, of means for periodically registering the integrated average demand as indicated by the pointer less a predetermined value.

27. The combination with a wattmeter having a pointer for indicating the logarithmic average demand for power, of means for periodically registering the integrated movement of the pointer.

In testimony whereof I have hereunto signed my name.

PAUL M. LINCOLN.